United States Patent [19]
Gehres

[11] Patent Number: 5,115,542
[45] Date of Patent: May 26, 1992

[54] HOSE SEPARATOR CLIP

[75] Inventor: Michelle R. Gehres, Convoy, Ohio

[73] Assignee: Navistar International Transportation Corp., Chicago, Ill.

[21] Appl. No.: 777,985

[22] Filed: Oct. 17, 1991

[51] Int. Cl.⁵ .......................... A44B 21/00; F16L 3/00
[52] U.S. Cl. ........................................ 24/543; 24/339; 24/487; 248/68.1
[58] Field of Search .................. 24/543, 329, 335, 339, 24/285, 286, 487, 557, 16 R, 20 EE; 248/68.1, 71

[56] References Cited

U.S. PATENT DOCUMENTS

| | | | |
|---|---|---|---|
| 1,051,245 | 1/1913 | Marchal | 24/329 |
| 4,478,381 | 10/1984 | Pittion et al. | 248/71 |
| 4,775,121 | 10/1988 | Carty | 24/543 |
| 4,799,641 | 1/1989 | Koreski | 24/329 |
| 4,881,705 | 11/1989 | Kraus | 248/68.1 |
| 5,050,272 | 9/1991 | Robinson et al. | 24/543 |

Primary Examiner—Victor N. Sakran
Attorney, Agent, or Firm—Dennis K. Sullivan

[57] ABSTRACT

A reusable hose separating clip comprises an elongate one piece plastic unit including a living hinge centrally located along the length thereof. The hinge forms two clip halves thereabout which are substantially mirror images of one another except for the latching structure at the free end of each half. Each hinge half includes arcuate areas separated by flats, with corresponding arcuate areas on the clip halves defining circular channels therebetween for engaging hoses therein when the clip halves are pivoted together about the hinge and the latch structures are engaged. When the clip halves are engaged, the corresponding flats are spaced from one another to allow for use with oversized or swelled hoses.

8 Claims, 3 Drawing Sheets

HOSE SEPARATOR CLIP

BACKGROUND OF THE INVENTION

The present invention relates to a hose separator clip for use in motor vehicles for keeping at least a pair of hoses, such as heater hoses, from rubbing together in an area, such as a vehicle engine compartment, where it would be difficult to clamp the hoses to a fixed surface. More particularly, the clip includes separated hose receiving and engaging cavities within which portions of adjacent hoses can be secured to keep them from coming into contact with one another.

THE PRIOR ART

Heretofore, various devices have been proposed for use in separating and securing structures such as hoses or wires in, for example, the engine compartment of a vehicle, as well as on construction equipment.

For example, wire separating clips have been used on automobiles to keep spark plug wires from contacting one another or contacting the engine. Such devices may or may not be secured to a support structure with the wires being received within openings provided for same in the device.

Also, in articulated construction equipment and backhoes, hydraulic hoses are maintained separate by metal clamps formed of halves which are bolted together and forming a circular trap for each of the hoses.

SUMMARY OF THE INVENTION

As will be described in greater detail hereinafter, the hose separator clip of the present invention differs from those previously proposed by comprising a one piece polypropylene structure including a living hinge creating two clip halves which can be rotated about the hinge and snap locked together about the hoses and also removed without damage. When the clip halves are engaged as by a latch structure at the ends opposite the hinge, spaced apart hose engaging arcuate channels are created which are ribbed to frictionally engage the hoses. Further, the channels are laterally spaced from one another by intermediate adjacent laterally extending flat portions of the clip disposed between the channels, the flat portions being spaced apart, creating a gap therebetween for accommodating oversized hoses as well as swelling of the hoses without pinching.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
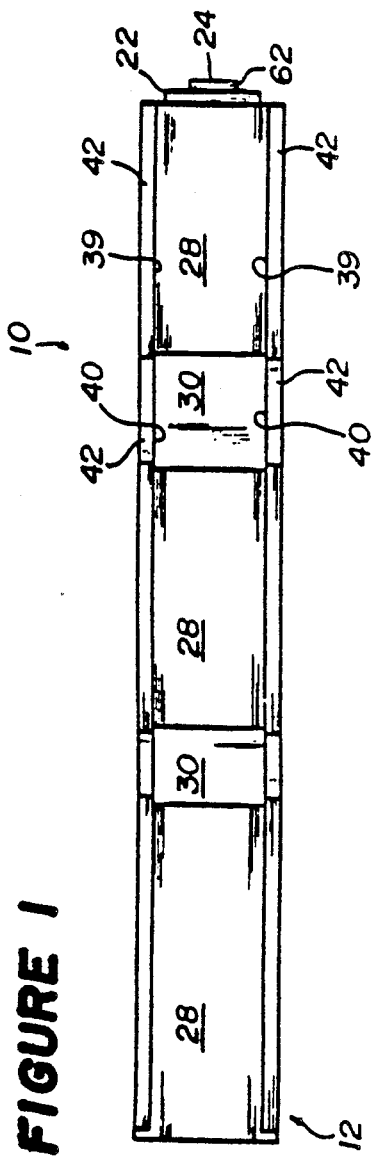
FIG. 1 is a top view of the clip of the present invention showing same when the two halves thereof are engaged to one another about a living hinge of the clip.

Referring now to the drawings in greater detail, there is illustrated therein a hose separator clip 10 made in accordance with the teachings of the present invention.

The embodiment disclosed herein is structured to accommodate three hoses, as will be described hereinafter, but the clip 10 may be simply modified to accept two hoses or a greater number of hoses, as required.

As shown, the clip 10 comprises a one piece structure which incorporates a living hinge 12 placed centrally along the length thereof, creating two substantially mirror image clip halves 14 and 16 disposed symmetrically thereabout. The only difference between the halves 14, 16 arises at the opposed ends 18 and 20 of the clip 10, wherein one end 18 incorporates a tab receiving latch 22 and wherein the other end 20 incorporates a latch engaging tab 24 thereon.

Turning now to a study of one clip half 14, it will be seen to include three semicircular arcuate portions 28 which are spaced apart laterally along the length of the half 14 by intermediate laterally extending flats 30. The arcuate portions 28, as shown, may be of the same or different diameters to accommodate different size hoses therein, as will be defined below. The arcuate portions 28 include on a concave interior surface 35 thereof a plurality of parallel circumferentially extending ribs 36.

On an exterior convex surface 38 of each arch 28 along axial end edges 39 thereof, and continuing along the end edges 40 of the flats 30 therebetween, are provided peripheral flanges 42, which provide rigidity to the structure the clip half 14 and expedite graspability of the clip 10, as well as serving as a small spacer element for spacing the clip 10 from any surface against which it may abut during use.

Figure 2:
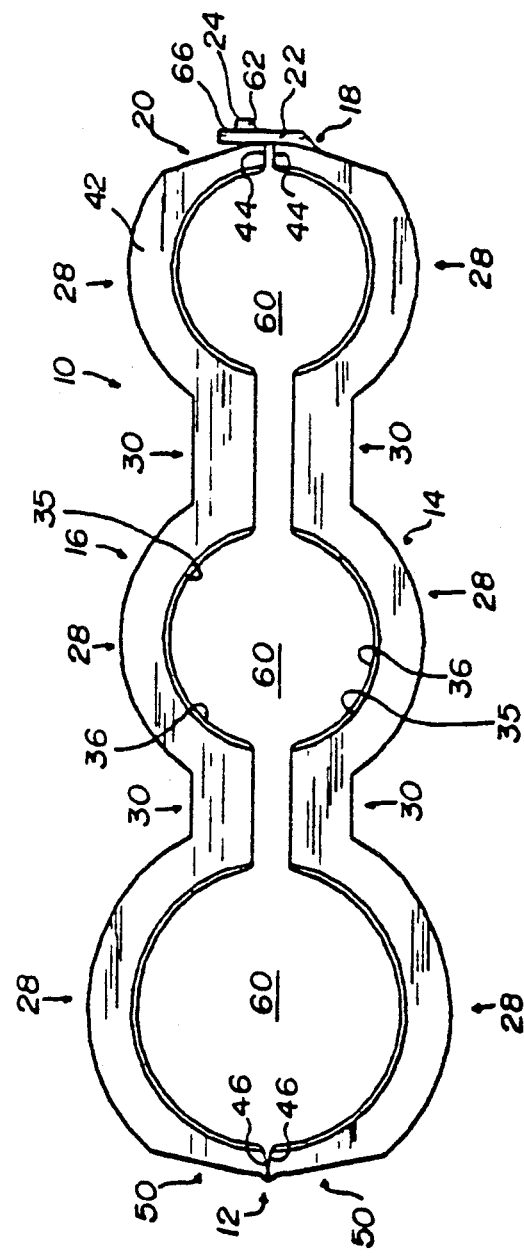
FIG. 2 is a side view of the clip of FIG. 1.
Figure 9:
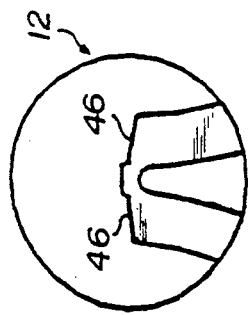
Figure 6:
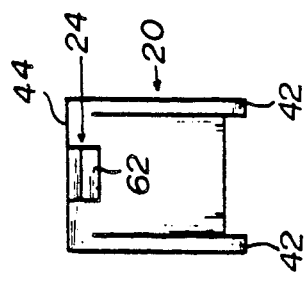
FIG. 6 is an end view of the opposite end of the clip and shows a latch engaging tab thereof in detail.
Figure 8:
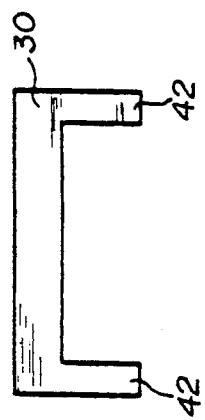
FIG. 8 is a cross section through a flat area of the clip between adjacent arcuate portions and is taken along line 8—8 of FIG. 4; and, FIG. 9 is an enlarged view of the center portion of the clip of FIG. 4 including the living hinge of the clip.
Figure 5:
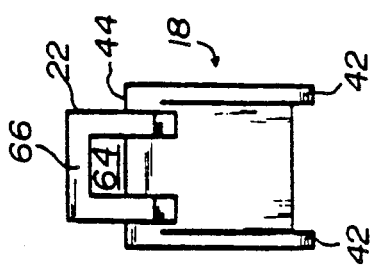
FIG. 5 is an end view of the clip of FIG. 4 and shows a tab engaging latch thereof in detail.
Figure 7:
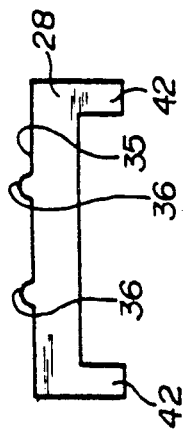
FIG. 7 is a cross section through an arcuate area of the clip and is taken along line 7—7 of FIG. 4.

The flats 30 between the arcuate portions 28 are offset from a plane disposed between terminal flats 44 and 46 at the ends 18 and 20 of the clip halves 14 and 16, the flat 46 at the hinge end 50 of each clip half 14 and 16, being angled downwardly slightly as it extends away from the hinge 12 to prevent undue stress from being placed on the living hinge 12 by sqeezing the clip halves 14, 16 together, for example, at the top of the arcuate portions 28 adjacent the hinge 12. The requirement for this configuration of the hinge end flats 46 is best understood upon study of FIGS. 2 and 9.

When the clip halves 14 and 16 are rotated about the hinge 12 toward one another and latched together at the free ends 18 and 20 thereof, the concave surfaces 35 of the arcuate portions 38 are brought toward one another, defining a circular channel 60 therebetween within which a half of a hose may be trapped and held in place by the ribs 36 thereinside.

Because of the offset of the flats 30 between the arcuate portions 28, in relation to the height of the end flats 46, a spacing between corresponding intermediate flats 30 is produced which allows an adjacent channel 60 to accommodate a hose having a slightly oversized outer diameter or one that has swelled through use, without injuring the hose engaged therein. This spacing of the flats 30 occurs because the flats 44 and 46 at the free ends 18 and 20 of the clip 10 create a stop for keeping the half ends 18 and 20 from sliding past one another when the clip 10 is secured about the hoses to be engaged thereby by the tab receiving latch 22 provided at the end 18 of the clip 10 and the latch engaging tab 24 at the other end 20 of the clip 10.

In this respect, the tab 24 has an L-shaped cross section, with a base leg 62 of the tab 24 fitting through a central opening 64 in the latch 22 and engaging against an end flange 66 thereof.

For simple removal of the clip 10 from engagement about the hoses, the end flats 44 and 46 are held against one another and the clip half 16 bearing the tab 24 is moved longitudinally toward the hinge 12, pulling the base leg 62 of the tab 24 out of engagement with the end flange 66 and through and out of engagement within the latch opening 64, providing a simple manner of detachment and further providing a reusable clip 10.

Figure 3:
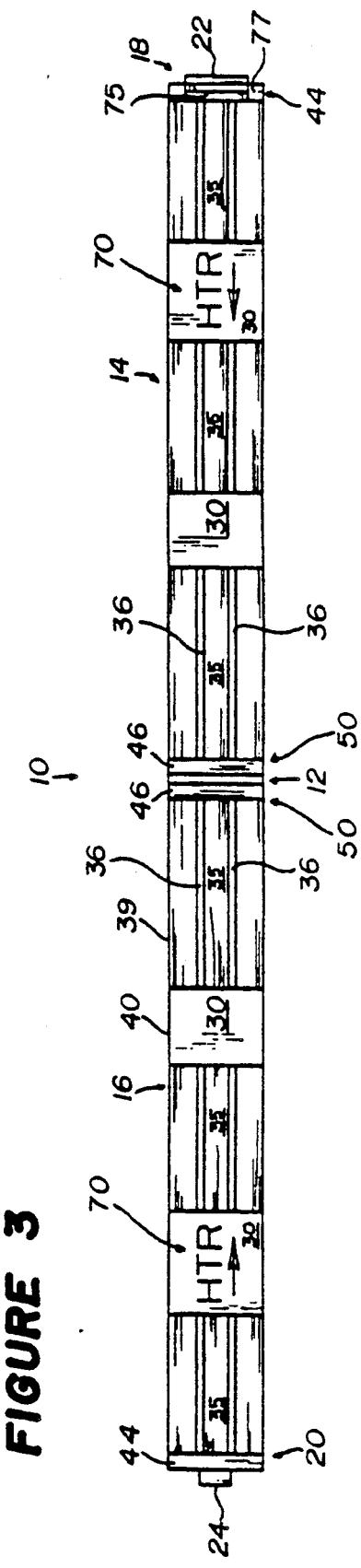
FIG. 3 is a top view of the clip of FIG. 1 when the two halves of the clip are undone and opened to lie end to end.
Figure 4:
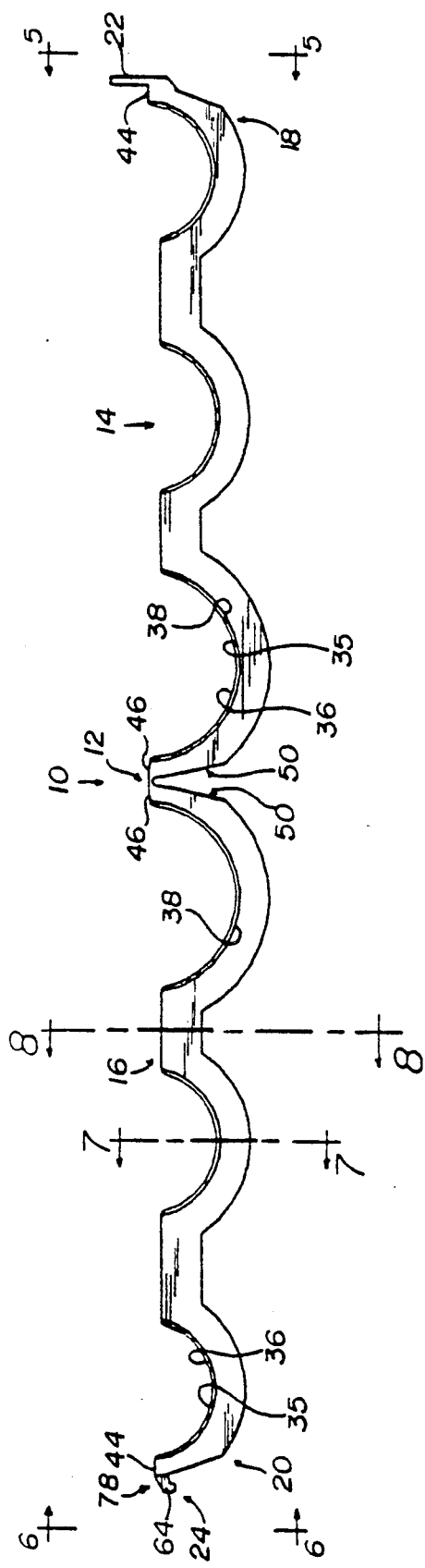
FIG. 4 is a side view of the clip of FIG. 3.

Returning to FIG. 3 for a moment, it will be seen that alignment or identifying indicia 70 may be provided on the flats 30 in a manner to identify which hose should be engaged within a properly sized channel 60 for same. For example, in the preferred embodiment disclosed herein, it is preferred that a heater hose (not shown) be engaged within the center channel 60, simplifying hose routing.

The end 18 of the clip half 14 incorporating the latch 22 is seen to include an indentation 75 centrally located along the length of surface 77 of the end flat 44 thereof. This indentation 75 is provided to accommodate the angulated engagement of the tab 24 at the end 20 of the other clip half 16 and creates an open area 75 within which an angulated junction 78 of tab 24 to flat 44 may seat without causing undue stress between the tab 24 and the latch 22.

Further, to relieve stress on the tab 24 and latch 22 during engagement and disengagement therebetween, the opening 64 within the latch 22 is disposed to allow for slight spacing to exist between the end flats 44 adjacent thereto when the clip halves 14 and 16 are latched together, allowing some "play" to exist between the clip halves 14 and 16 when they are engaged, further relieving stress on the hinge 12 as well.

As described above, the clip 10 has a number of advantages, some of which have been described above and others of which are inherent in the invention. It will be apparent to those of ordinary skill in the art that modifications may be made to the clip 10 without departing from the teachings herein. Accordingly, the scope of the invention is only to be limited as necessitated by the accompanying claims.

I claim:

1. A hose separator clip for connecting a plurality of hoses comprising an elongate one piece unitary structure having a living hinge disposed centrally along the length thereof, forming two substantially mirror image clip halves thereabout, said mirror image clip halves including cooperative latch means at free ends thereof for releasably connecting said free ends together, each said clip half including a plurality of arcuate areas with corresponding arcuate areas of said clip halves defining spaced apart circular hose receiving channels therebetween when said clip halves are pivoted about said hinge and latched to one another, said arcuate areas being separated from one another along the length of each clip half by intermediate flat portions disposed parallel to but offset from a midline of said clip, the midline extending between the hinge and free ends when the clip halves are latched together, said intermediate flat portions defining a substantial gap therebetween upon said clip halves being latched together.

2. The clip of claim 1 wherein said arcuate areas each include a concave surface having a circumferential rib thereon.

3. The clip of claim 2 wherein said cooperative latch means comprises a latch engaging tab disposed on one half and a tab receiving latch disposed on the other clip half.

4. The clip of claim 1 wherein said intermediate flat portions include hose position identifying indicia thereon.

5. The clip of claim 1 wherein end flat portions on said clip halves adjacent said latch means are disposed adjacent said midline to stop movement of said clip halves toward each other while said intermediate flat portions remain separated.

6. The clip of claim 1 wherein said arcuate areas on a clip half are of different diameters.

7. The clip of claim 1 wherein corresponding arcuate areas of each clip half have the same diameter.

8. The clip of claim 1 wherein each clip half includes lateral edge flanges which are parallel to one another and extend in a direction outwardly from said midline.

* * * * *